June 21, 1932.　　R. F. BACON ET AL　　1,864,290
RECOVERY OF SULPHUR
Filed Feb. 26, 1930
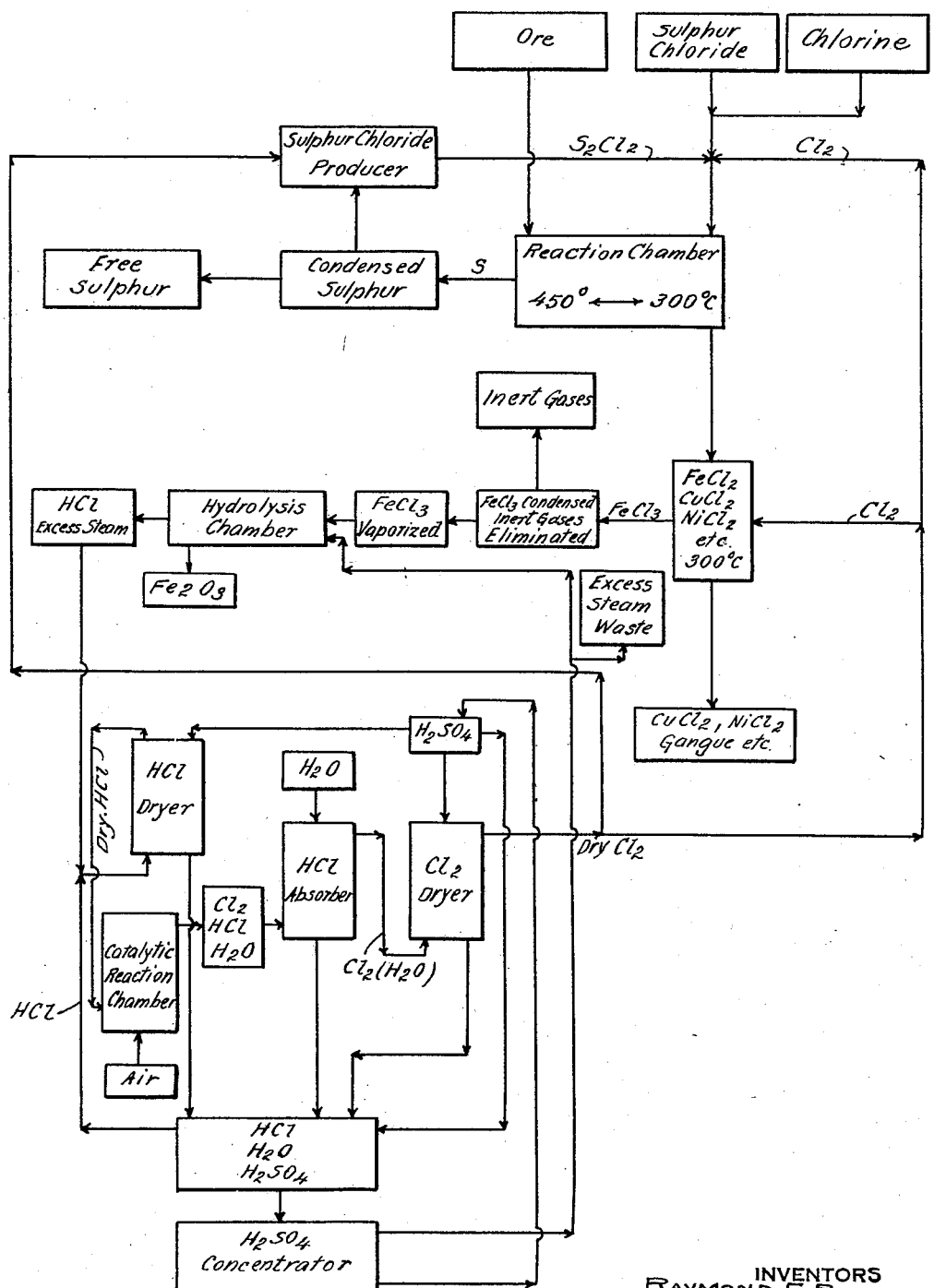
INVENTORS
RAYMOND F. BACON
HENRY T. Hotchkiss, Jr
BY
　　ATTORNEYS

UNITED STATES PATENT OFFICE

RAYMOND F. BACON, OF BRONXVILLE, AND HENRY T. HOTCHKISS, JR., OF NEW ROCHELLE, NEW YORK; SAID HOTCHKISS, JR., ASSIGNOR TO SAID BACON

RECOVERY OF SULPHUR

Application filed February 26, 1930. Serial No. 431,468.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel with sulphur chloride and chlorine for the purpose of obtaining free sulphur and/or separating iron from the mass of material undergoing treatment.

In carrying out a process in accordance with the present invention, a quantity of ore or other material to be treated is subjected to the action of sulphur chloride and chlorine under such conditions that ferrous chloride and free sulphur are produced. The operation is so conducted that the sulphur produced is vaporized, leaving a residue containing the ferrous chloride together with chlorides of other heavy metals, such as copper and nickel, when the sulphides of such metals are present in the material undergoing treatment. The sulphur produced is condensed and collected as free sulphur. The residue containing ferrous chloride is subjected to the action of chlorine gas to form and vaporize ferric chloride. The ferric chloride produced is subjected to the action of superheated steam to produce hydrogen chloride which is subjected to the action of oxygen to produce free chlorine. The chlorine thus produced is returned to the process.

The invention will be better understood from a consideration of the accompanying flowsheet and the following description of the application of the invention to the treatment of ore containing sulphides of iron, copper and nickel.

The ore to be treated is subjected to the action of sulphur chloride and chlorine under such conditions that ferrous chloride and free sulphur are produced. The operation is so conducted that the sulphur produced is vaporized, leaving a residue containing the ferrous chloride together with the chlorides of copper and nickel. The sulphur may be vaporized by means of inert gases introduced with the sulphur chloride and/or chlorine or a temperature sufficiently high to vaporize the sulphur may be maintained and substantially pure sulphur chloride and/or chlorine gas may be employed.

The process of the invention involves the recovery of chlorine and the return of the chlorine recovered to the process. A portion of the recovered chlorine is used for treating the ferrous chloride-bearing material, another portion is combined with sulphur to regenerate sulphur chloride, and the remainder is used for treating additional ore. The chlorine when first recovered is mixed with inert gases, and the mixture may be used for regenerating sulphur chloride and for treating additional ore. The inert gases mixed with the portion of the chlorine used for regenerating sulphur chloride may be readily eliminated by condensing the sulphur chloride.

When the inert gases mixed with the chlorine and/or sulphur chloride are introduced into the reaction chamber, the reaction chamber may be maintained at a temperature above or below the boiling point of sulphur. At either or both temperatures, the reaction may be so controlled that the inert gases aid in sweeping the sulphur from the reaction chamber. A temperature of about 300° C. to 350° C. may be maintained throughout the entire reaction chamber.

The ore is preferably introduced in a dry, finely divided condition into the interior of a rotary reaction chamber having ore charging means at one end and discharging means at the other end, and which is so constructed and operated that the ore is gradually moved from the charging end toward the discharge end. Sulphur chloride and chlorine gas alone or mixed with other gases are introduced into the reaction chamber at the end opposite to that at which the ore is introduced and the ore and sulphur chloride and chlorine pass through the reaction chamber in counter-current relationship. The sulphur chloride may be introduced into the reaction chamber in either the liquid state or the gaseous state. Liquid sulphur chloride will be vaporized immediately after its introduction. The ore is preferably ground to provide particles sufficiently small to pass a 100-mesh screen in order that intimate contact of the sulphur chloride and chlorine with the sulphide particles may be obtained.

The process is preferably so controlled that a temperature of about 450° C. is maintained near the ore charging end of the reaction chamber, and a temperature of about 300° C. to 350° C. is maintained near the discharge end of the reaction chamber. The sulphur chloride and chlorine in any desired concentrations and at any desired temperatures are introduced into a portion of the reaction chamber which is maintained at a temperature of about 300° C. to 350° C. The sulphur chloride and chlorine and the metal sulphides react to produce elemental sulphur, ferrous chloride and the chlorides of copper and nickel. The admission of ore and sulphur chloride and chlorine is preferably so regulated that all of the sulphur liberated is vaporized as elemental sulphur, all of the sulphur chloride and chlorine admitted is consumed, and substantially all of the iron sulphide is converted to ferrous chloride.

Any ferric chloride which is produced in the reaction chamber will be vaporized and swept along with the incoming sulphur chloride and chlorine to meet the entering iron sulphide-bearing material. The ferric chloride will react with the sulphides to form ferrous chloride and sulphur chloride. Sulphur chloride which is formed will also react with the heavy metal sulphides. The reaction between the sulphides and the sulphur chloride and chlorine is exothermic and the desired temperatures may be maintained by the heat developed.

The sulphur produced is vaporized and separated from the heavy metal chlorides in the hottest portion of the reaction chamber, and the residue containing the heavy metal chlorides is discharged from the reaction chamber at a temperature of about 300° C. to 350° C. The vaporized sulphur is collected and condensed.

The hot residue containing ferrous chloride is subjected to the action of chlorine gas to produce and vaporize ferric chloride. The treatment of the ferrous chloride-bearing material is preferably conducted in a rotary reaction chamber which is so constructed and arranged that ferrous chloride-bearing material charged into one end portion will move progressively toward the other end portion during its rotation. The ferrous chloride-bearing material and the chlorine gas are preferably introduced into opposite ends of the reaction chamber and pass through the reaction chamber in counter-current relationship. The ferrous chloride-bearing material thus passes gradually into regions of increasing chlorine concentrations and a substantially complete removal of iron from the mass is assured.

The hot residue contains nickel chloride and copper chloride in addition to ferrous chloride and gangue, and it enters the reaction chamber at a temperature of about 300° C. The chlorine employed for treating the ferrous chloride-bearing material comprises, in part at least, chlorine which is recovered in a subsequent step of the process from ferric chloride produced during the course of the treatment, and it is contaminated with inert gases which are introduced into the system. The inert gases may be utilized for sweeping the ferric chloride from the reaction chamber, and the reaction chamber may, therefore, be maintained at a temperature below the boiling point of ferric chloride. Satisfactory results may be obtained if the reaction chamber is maintained at a temperature of about 300° C., but temperatures above 300° C. and preferably above 315° C., the boiling point of ferric chloride, are more desirable, a temperature of about 350° C. being very satisfactory.

A reaction between ferrous chloride and chlorine proceeds according to the following equation:

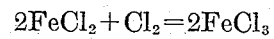
$$2FeCl_2 + Cl_2 = 2FeCl_3$$

The chlorides of nickel and copper remain unchanged and do not vaporize to any substantial extent when a temperature between about 300° C. and 350° C. is maintained.

A residue containing the chlorides of copper and nickel and the gangue contained in the original ore is discharged from the reaction chamber and it may be treated in any desired manner to separate and recover the valuable components.

The vaporized ferric chloride is collected and condensed to eliminate inert gases. The condensed ferric chloride is vaporized and subjected to the action of water vapor at an elevated temperature in a suitable reaction chamber. The ferric chloride is hydrolyzed and ferric oxide and hydrogen chloride are formed, the reaction proceeding according to the following equation:

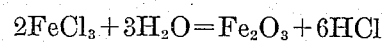
$$2FeCl_3 + 3H_2O = Fe_2O_3 + 6HCl$$

In carrying out the hydrolysis of ferric chloride, ferric chloride vapor and superheated steam are introduced together into the reaction chamber in such a manner that intimate mixing will result. The reaction may be conducted conveniently at a temperature of about 300° C. to 400° C. Good results may be obtained if the reaction chamber is maintained at a temperature of about 350° C.

The ferric oxide will be produced in the form of a fine powder which may be permitted to settle out in the reaction chamber. The gases issuing from the chamber contain hydrogen chloride and water vapor and they are passed through a suitable drying apparatus such, for example, as a packed tower having sulphuric acid trickling therethrough to separate the water vapor and produce dry hydrogen chloride.

The gases containing the dry hydrogen chloride are introduced into a catalytic reaction chamber with one to seven times their volume of air, depending on the concentration of the hydrogen chloride available. The air is preheated to a temperature above 420° C. and preferably to a temperature between 520° C. and 530° C. If desired, the hydrogen chloride may also be preheated.

The catalytic reaction chamber preferably consists of a tower, or a series of communicating towers packed with porous material having a very large surface per unit of volume such, for example, as pumice, brick, cinders and the like. The packing material should be of such a nature that it will be inert to the reagents and the products of the reaction. The packing material is covered or impregnated with the catalyst which promotes a reaction between hydrogen chloride and oxygen, and which may consist of one or more chlorides or sulphates of metals such, for example, as copper and nickel. The salts may be applied as such directly to the packing material or they may be formed in place as, for example, by the action of hydrogen chloride on copper oxide which is distributed throughout the mass. Means are provided for renewing the catalytic mass as its efficiency becomes reduced. For this purpose two towers, or two series of communicating towers, which may be used alternately are preferably provided.

The apparatus is so constructed that the mass of catalyst-bearing material may be maintained at a temperature of from 370 to 400° C. The reaction between the hydrogen chloride and the oxygen of the air is exothermic and it may be so controlled as to permit the proper temperature to be maintained. The reaction will proceed at a temperature as low as 205° C. and a temperature as high as 470° C. may be used advantageously. The temperature at which the reaction is conducted will be governed largely by the nature of the catalyst. The temperature employed should be sufficiently low that excessive volatilization of the catalyst is avoided. The reaction involved in this operation does not proceed to completion. The gases issuing from the reaction chamber will consist of a mixture of hydrogen chloride, water vapor and chlorine.

In view of the fact that the reaction does not readily proceed to completion, it may be desirable to retreat the issuing gases by subjecting them to a drying operation to remove the water vapor and subsequently passing them through a second reaction chamber. This procedure may be repeated two or three or more times if desired. In carrying out the reaction between hydrogen chloride and the oxygen of air it is advisable to carefully control the proportions of air and hydrogen chloride utilized in order to avoid excessive dilution of the resulting chlorine gas and in order to avoid the incorporation of excessive amounts of free oxygen in the resulting chlorine gas.

The gases are washed with water to separate the chlorine and hydrogen chloride. The separated chlorine is dried with sulphuric acid, and a portion of the dried gas is utilized for treating the residue containing ferrous chloride.

Another portion of the dry chlorine is passed through a molten bath of sulphur which has been obtained by condensing a portion of the sulphur vapor recovered during the treatment of sulphide-bearing material with sulphur chloride and chlorine. The sulphur bath is maintained at a temperature above the boiling point of sulphur chloride and the sulphur chloride distills off as formed. The sulphur chloride vapor may be collected and condensed to eliminate inert gases, or the resulting mixture of sulphur chloride and inert gases may be conducted directly to the reaction chamber for the treatment of additional ore. If the sulphur chloride vapor is condensed the liquid sulphur chloride may be vaporized and returned to the process.

The reaction between sulphur and chlorine will proceed at temperatures below the boiling point of sulphur chloride, but it is advantageous to conduct the reaction at a temperature above the boiling point of sulphur chloride in order to effect the immediate removal of the sulphur chloride from the reaction zone. Condensation of the sulphur chloride vapors permits the removal of inert gases which enter the system during the admission of air. If desired, the inert gases may be conducted through a tower containing solid sulphur in order to scrub out any sulphur chloride vapors contained therein.

The sulphuric acid used for drying the hydrogen chloride and chlorine is combined with the water used for separating the hydrogen chloride and chlorine and the resulting liquid is heated to recover hydrogen chloride which is returned to the process. The sulphuric acid which has been freed from hydrogen chloride is concentrated and again used for drying purposes. A portion of the steam produced in concentrating the sulphuric acid is utilized for treating the ferric chloride. The first fractions obtained during the concentration of the sulphuric acid will contain hydrogen chloride and the use of these fractions in providing super-heated steam for treating the ferric chloride will permit an added recovery of chlorine.

As a result of the treatment of the hydrogen chloride with air, considerable quantities of inert gases, such as nitrogen, are introduced into the system and must be eliminated to avoid excessive dilution. The inert gases will be mixed with the chlorine gas which is recovered, and consequently, they will be returned to the system during the treatment of original ore and during the treatment of the ferrous chloride-bearing residue. Elimination of these gases is effected by condensing the ferric chloride and by condensing the vaporized sulphur.

The process may be conducted continuously. A source of fresh chlorine is provided to compensate for chlorine losses due to leakage and the production of nickel and copper chlorides. The fresh chlorine may be supplied as chlorine gas, sulphur chloride or hydrogen chloride and the choice will be determined by the relative costs.

The principal reactions involved in the process are exothermic and enough heat is provided that no heat need be supplied from outside sources. Heat generated during the course of the process may be utilized for carrying out the concentration of the sulphuric acid, vaporization of ferric chloride and other operations in which temperatures must be increased.

We claim:

1. The method of treating material containing iron sulphide which comprises subjecting the material to the action of chlorine and sulphur chloride under such conditions that ferrous chloride and elemental sulphur are produced and the sulphur is vaporized, subjecting the ferrous chloride to the action of chlorine to form ferric chloride, subjecting the ferric chloride to the action of water vapor to produce hydrogen chloride, treating the hydrogen chloride to recover chlorine, and returning the chlorine thus recovered to the process.

2. The method of treating material containing iron sulphide which comprises subjecting the material to the action of chlorine and sulphur chloride under such conditions that ferrous chloride and elemental sulphur are produced and the sulphur is vaporized, subjecting the ferrous chloride to the action of chlorine to form ferric chloride, subjecting the ferric chloride to the action of water vapor to produce hydrogen chloride, subjecting the hydrogen chloride to the action of air in the presence of a catalyst to recover chlorine, and returning the chlorine thus recovered to the process.

3. The method of treating iron sulphide-bearing material which comprises subjecting the material to the action of chlorine and sulphur chloride under such conditions that ferrous chloride and elemental sulphur are produced and the sulphur is vaporized, collecting the vaporized sulphur, subjecting the ferrous chloride to the action of chlorine to form ferric chloride, treating the ferric chloride to recover chlorine, utilizing a portion of the recovered chlorine to treat the ferrous chloride, combining another portion of the chlorine with a portion of the sulphur produced to regenerate sulphur chloride, and utilizing the remainder of the recovered chlorine together with the regenerated sulphur chloride to treat additional iron-sulphide-bearing material.

4. The method of treating iron sulphide-bearing material which comprises subjecting the material to the action of chlorine and sulphur chloride under such conditions that ferrous chloride and elemental sulphur are produced and the sulphur is vaporized, collecting the vaporized sulphur, subjecting the ferrous chloride to the action of chlorine to form ferric chloride, subjecting the ferric chloride to the action of water vapor to form hydrogen chloride, treating the hydrogen chloride to recover chlorine, utilizing a portion of the recovered chlorine to treat the ferrous chloride, combining another portion of the chlorine with a portion of the sulphur produced to regenerate sulphur chloride, and utilizing the remainder of the recovered chlorine together with the regenerated sulphur chloride to treat additional iron sulphide-bearing material.

5. The method of treating iron sulphide-bearing material which comprises subjecting the material to the action of chlorine and sulphur chloride under such conditions that ferrous chloride and elemental sulphur are produced and the sulphur is vaporized, collecting the vaporized sulphur, subjecting the ferrous chloride to the action of chlorine to form ferric chloride, subjecting the ferric chloride to the action of water vapor to form hydrogen chloride, subjecting the hydrogen chloride to the action of air in the presence of a catalyst to recover chlorine, utilizing a portion of the recovered chlorine to treat the ferrous chloride, combining another portion of the chlorine with a portion of the sulphur produced to regenerate sulphur chloride, and utilizing the remainder of the recovered chlorine together with the regenerated sulphur chloride to treat additional iron sulphide-bearing material.

In testimony whereof we affix our signatures.

RAYMOND F. BACON.
HENRY T. HOTCHKISS, Jr.